(12) United States Patent
Kimura

(10) Patent No.: US 8,731,071 B1
(45) Date of Patent: May 20, 2014

(54) SYSTEM FOR PERFORMING FINITE INPUT RESPONSE (FIR) FILTERING IN MOTION ESTIMATION

(75) Inventor: Scott A. Kimura, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1379 days.

(21) Appl. No.: 11/304,396

(22) Filed: Dec. 15, 2005

(51) Int. Cl.
*G06F 15/00* (2006.01)
*G06F 9/30* (2006.01)
*G06F 12/06* (2006.01)

(52) U.S. Cl.
USPC ............. 375/240.29; 375/570; 375/240.25; 345/570; 345/531; 712/34; 712/36; 712/225

(58) Field of Classification Search
USPC ........ 375/240.26; 345/690, 570, 531; 712/34, 712/36, 225, 795
See application file for complete search history.

(56) References Cited

U.S. PATENT DOCUMENTS

| | | | |
|---|---|---|---|
| 3,679,821 A | 7/1972 | Schroeder | |
| 4,177,514 A | 12/1979 | Rupp | |
| 4,583,164 A | 4/1986 | Tolle | |
| 4,591,979 A | 5/1986 | Iwashita | |
| 4,644,461 A | 2/1987 | Jennings | |
| 4,755,810 A * | 7/1988 | Knierim | 345/564 |
| 4,814,978 A | 3/1989 | Dennis | |
| 4,992,857 A * | 2/1991 | Williams | 375/240.01 |
| 5,045,940 A | 9/1991 | Peters et al. | |
| 5,130,797 A | 7/1992 | Murakami et al. | |
| 5,146,324 A | 9/1992 | Miller et al. | |
| 5,212,742 A | 5/1993 | Normile et al. | |
| 5,225,875 A * | 7/1993 | Shapiro et al. | 345/690 |
| 5,233,689 A * | 8/1993 | Rhoden et al. | 345/570 |
| 5,267,334 A | 11/1993 | Normille et al. | |
| 5,267,344 A | 11/1993 | Nelson, III | |
| 5,369,744 A | 11/1994 | Fukushima et al. | |

(Continued)

FOREIGN PATENT DOCUMENTS

| | | |
|---|---|---|
| CN | 1489391 | 4/2004 |
| EP | 1283640 A2 | 12/2003 |

(Continued)

OTHER PUBLICATIONS

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.

(Continued)

*Primary Examiner* — Akwasi M Sarpong

(57) ABSTRACT

A system for performing finite input response filtering. The system includes an array of random access memories (RAMs) for storing at least one two-dimensional (2D) block of pixel data. The pixel data is stored such that one of each type of column or row from the 2D block of pixel data is stored per RAM. A control block provides address translation between the 2D block of pixel data and corresponding addresses in the array of RAMs. An input crossbar writes pixel data to the array of RAMs as directed by the control block. An output crossbar simultaneously reads pixel data from each of the array of RAMs and passes the data to an appropriate replicated data path, as directed by the control block. A single instruction multiple data path block includes a plurality of replicated data paths for simultaneously performing the FIR filtering, as directed by the control block.

19 Claims, 9 Drawing Sheets

400B

| | RAM 0 | RAM 1 | RAM 2 | RAM 3 | RAM 4 | RAM 5 | RAM 6 | RAM 7 |
|---|---|---|---|---|---|---|---|---|
| addr0 | 0,0  8,0 | 7,0 F,0 | 6,0 E,0 | 1,0 9,0 | 2,0 A,0 | 5,0  D,0 | 4,0 C,0 | 3,0 B,0 |
| addr1 | 4,1 C,1 | 3,1 B,1 | 0,1  8,1 | 7,1 F,1 | 6,1 E,1 | 1,1 9,1 | 2,1 A,1 | 5,1  D,1 |
| addr2 | 2,2 A,2 | 5,2  D,2 | 4,2 C,2 | 3,2 B,2 | 0,2  8,2 | 7,2 F,2 | 6,2 E,2 | 1,2 9,2 |
| addr3 | 6,3 E,3 | 1,3 9,3 | 2,3 A,3 | 5,3  D,3 | 4,3 C,3 | 3,3 B,3 | 0,3  8,3 | 7,3 F,3 |
| addr4 | (0,4) 8,4 | 7,4 F,4 | 6,4 E,4 | (1,4) 9,4 | (2,4) A,4 | 5,4 D,4 | 4,4 C,4 | (3,4) B,4 |
| addr5 | 4,5 C,5 | (3,5) B,5 | (0,5) 8,5 | 7,5 F,5 | 6,5 E,5 | (1,5) 9,5 | (2,5) A,5 | 5,5 D,5 |

(56) References Cited

U.S. PATENT DOCUMENTS

| | | | | |
|---|---|---|---|---|
| 5,371,896 | A * | 12/1994 | Gove et al. | 712/20 |
| 5,596,369 | A | 1/1997 | Chau | |
| 5,598,514 | A | 1/1997 | Purcell et al. | |
| 5,608,652 | A | 3/1997 | Astle | |
| 5,613,146 | A | 3/1997 | Gove et al. | |
| 5,623,311 | A | 4/1997 | Phillips et al. | |
| 5,630,033 | A | 5/1997 | Purcell et al. | |
| 5,646,692 | A * | 7/1997 | Bruls | 375/240.25 |
| 5,657,465 | A | 8/1997 | Davidson et al. | |
| 5,768,429 | A | 6/1998 | Jabbi et al. | |
| 5,790,881 | A | 8/1998 | Nguyen | |
| 5,809,538 | A | 9/1998 | Pollmann et al. | |
| 5,821,886 | A * | 10/1998 | Son | 341/67 |
| 5,845,083 | A | 12/1998 | Hamadani et al. | |
| 5,870,310 | A | 2/1999 | Malladi | |
| 5,883,823 | A | 3/1999 | Ding | |
| 5,889,949 | A | 3/1999 | Charles | |
| 5,898,881 | A | 4/1999 | Miura et al. | |
| 5,909,224 | A * | 6/1999 | Fung | 345/531 |
| 5,923,375 | A | 7/1999 | Pau | |
| 5,954,786 | A | 9/1999 | Volkonsky | |
| 5,969,728 | A | 10/1999 | Dye et al. | |
| 5,999,220 | A | 12/1999 | Washino | |
| 6,035,349 | A | 3/2000 | Ha et al. | |
| 6,073,185 | A | 6/2000 | Meeker | |
| 6,088,355 | A | 7/2000 | Mills et al. | |
| 6,098,174 | A | 8/2000 | Baron et al. | |
| 6,104,470 | A * | 8/2000 | Streefkerk et al. | 355/40 |
| 6,144,362 | A | 11/2000 | Kawai | |
| 6,148,109 | A | 11/2000 | Boon et al. | |
| 6,157,751 | A * | 12/2000 | Olson et al. | 382/304 |
| 6,175,594 | B1 | 1/2001 | Strasser et al. | |
| 6,188,799 | B1 | 2/2001 | Tan et al. | |
| 6,195,389 | B1 | 2/2001 | Rodriguez et al. | |
| 6,222,883 | B1 | 4/2001 | Murdock et al. | |
| 6,269,174 | B1 | 7/2001 | Koba et al. | |
| 6,272,281 | B1 | 8/2001 | De Vos et al. | |
| 6,305,021 | B1 | 10/2001 | Kim | |
| 6,311,204 | B1 | 10/2001 | Mills | |
| 6,317,124 | B2 * | 11/2001 | Reynolds | 345/422 |
| 6,356,945 | B1 | 3/2002 | Shaw et al. | |
| 6,360,234 | B2 | 3/2002 | Jain et al. | |
| 6,418,166 | B1 | 7/2002 | Wu et al. | |
| 6,459,738 | B1 | 10/2002 | Wu et al. | |
| 6,539,060 | B1 | 3/2003 | Lee et al. | |
| 6,539,120 | B1 | 3/2003 | Sita et al. | |
| 6,560,629 | B1 | 5/2003 | Harris | |
| 6,647,062 | B2 | 11/2003 | Mackinnon | |
| 6,665,346 | B1 | 12/2003 | Lee et al. | |
| 6,687,788 | B2 | 2/2004 | Vorbach et al. | |
| 6,690,835 | B1 | 2/2004 | Brockmeyer et al. | |
| 6,690,836 | B2 | 2/2004 | Natarajan et al. | |
| 6,708,246 | B1 | 3/2004 | Ishihara et al. | |
| 6,721,830 | B2 | 4/2004 | Vorbach et al. | |
| 6,751,721 | B1 | 6/2004 | Webb, Jr. et al. | |
| 6,760,478 | B1 | 7/2004 | Adiletta et al. | |
| 6,782,052 | B2 | 8/2004 | Sun et al. | |
| 6,799,192 | B1 | 9/2004 | Handley | |
| 6,807,317 | B2 | 10/2004 | Mathew et al. | |
| 6,823,443 | B2 | 11/2004 | Horiyama et al. | |
| 6,950,473 | B2 | 9/2005 | Kim et al. | |
| 6,993,639 | B2 | 1/2006 | Schlansker et al. | |
| 6,996,645 | B1 | 2/2006 | Wiedenman et al. | |
| 7,038,687 | B2 | 5/2006 | Booth, Jr. et al. | |
| 7,095,783 | B1 | 8/2006 | Sotheran et al. | |
| 7,173,631 | B2 | 2/2007 | Anderson | |
| 7,260,148 | B2 | 8/2007 | Sohm | |
| 7,277,101 | B2 | 10/2007 | Zeng | |
| 7,289,672 | B2 | 10/2007 | Sun et al. | |
| 7,379,501 | B2 | 5/2008 | Lainema | |
| 7,394,284 | B2 | 7/2008 | Vorbach | |
| 7,403,564 | B2 | 7/2008 | Laksono | |
| 7,450,640 | B2 | 11/2008 | Kim et al. | |
| 7,499,491 | B2 | 3/2009 | Lee et al. | |
| 7,548,586 | B1 * | 6/2009 | Mimar | 375/240.26 |
| 7,548,596 | B2 | 6/2009 | Yen et al. | |
| 7,551,671 | B2 | 6/2009 | Tyldesley et al. | |
| 7,565,077 | B2 | 7/2009 | Rai et al. | |
| 7,581,076 | B2 | 8/2009 | Vorbach | |
| 7,581,182 | B1 | 8/2009 | Herz | |
| 7,630,097 | B2 * | 12/2009 | Kodama et al. | 358/1.18 |
| 7,689,000 | B2 | 3/2010 | Kazama | |
| 7,693,219 | B2 | 4/2010 | Yan | |
| 7,720,311 | B1 | 5/2010 | Sriram | |
| 7,721,069 | B2 * | 5/2010 | Ramchandran et al. | 712/34 |
| 7,924,923 | B2 | 4/2011 | Lee et al. | |
| 7,996,827 | B2 | 8/2011 | Vorbach et al. | |
| 8,009,923 | B2 | 8/2011 | Li et al. | |
| 8,369,402 | B2 | 2/2013 | Kobayashi et al. | |
| 8,660,182 | B2 | 2/2014 | Zhong et al. | |
| 2001/0020941 | A1 * | 9/2001 | Reynolds | 345/422 |
| 2001/0024448 | A1 | 9/2001 | Takase et al. | |
| 2001/0028353 | A1 | 10/2001 | Cheng | |
| 2001/0028354 | A1 | 10/2001 | Cheng et al. | |
| 2002/0015445 | A1 | 2/2002 | Hashimoto | |
| 2002/0015513 | A1 | 2/2002 | Ando et al. | |
| 2002/0025001 | A1 | 2/2002 | Ismaeil et al. | |
| 2002/0041626 | A1 | 4/2002 | Yoshioka et al. | |
| 2002/0109790 | A1 | 8/2002 | Mackinnon | |
| 2002/0114394 | A1 | 8/2002 | Ma | |
| 2002/0118743 | A1 | 8/2002 | Jiang | |
| 2003/0020835 | A1 | 1/2003 | Petrescu | |
| 2003/0048361 | A1 | 3/2003 | Safai | |
| 2003/0078952 | A1 | 4/2003 | Kim et al. | |
| 2003/0141434 | A1 | 7/2003 | Ishikawa et al. | |
| 2003/0161400 | A1 | 8/2003 | Dinerstein et al. | |
| 2004/0057523 | A1 | 3/2004 | Koto et al. | |
| 2004/0095998 | A1 | 5/2004 | Luo et al. | |
| 2004/0100466 | A1 | 5/2004 | Deering | |
| 2004/0150841 | A1 | 8/2004 | Lieberman et al. | |
| 2004/0156435 | A1 | 8/2004 | Itoh et al. | |
| 2004/0174998 | A1 | 9/2004 | Youatt et al. | |
| 2004/0181564 | A1 | 9/2004 | MacInnis et al. | |
| 2004/0181800 | A1 | 9/2004 | Rakib et al. | |
| 2004/0190613 | A1 | 9/2004 | Zhu et al. | |
| 2004/0190617 | A1 | 9/2004 | Shen et al. | |
| 2004/0202245 | A1 | 10/2004 | Murakami et al. | |
| 2004/0213348 | A1 | 10/2004 | Kim et al. | |
| 2004/0218626 | A1 | 11/2004 | Tyldesley et al. | |
| 2004/0218675 | A1 | 11/2004 | Kim et al. | |
| 2004/0228415 | A1 | 11/2004 | Wang | |
| 2004/0257434 | A1 | 12/2004 | Davis et al. | |
| 2004/0268088 | A1 | 12/2004 | Lippincott et al. | |
| 2005/0008254 | A1 | 1/2005 | Ouchi et al. | |
| 2005/0033788 | A1 | 2/2005 | Handley | |
| 2005/0047502 | A1 | 3/2005 | McGowan | |
| 2005/0066205 | A1 | 3/2005 | Holmer | |
| 2005/0079914 | A1 | 4/2005 | Kaido et al. | |
| 2005/0105618 | A1 | 5/2005 | Booth et al. | |
| 2005/0123040 | A1 | 6/2005 | Bjontegard | |
| 2005/0190976 | A1 | 9/2005 | Todoroki et al. | |
| 2005/0238102 | A1 | 10/2005 | Lee et al. | |
| 2005/0238103 | A1 | 10/2005 | Subramaniyan et al. | |
| 2005/0265447 | A1 | 12/2005 | Park | |
| 2005/0265454 | A1 | 12/2005 | Muthukrishnan et al. | |
| 2005/0276493 | A1 | 12/2005 | Xin et al. | |
| 2005/0281337 | A1 | 12/2005 | Kobayashi et al. | |
| 2005/0286630 | A1 | 12/2005 | Tong et al. | |
| 2006/0002466 | A1 | 1/2006 | Park | |
| 2006/0017802 | A1 * | 1/2006 | Yoo et al. | 347/248 |
| 2006/0056513 | A1 | 3/2006 | Shen et al. | |
| 2006/0056708 | A1 | 3/2006 | Shen et al. | |
| 2006/0109910 | A1 | 5/2006 | Nagarajan | |
| 2006/0115001 | A1 | 6/2006 | Wang et al. | |
| 2006/0133501 | A1 | 6/2006 | Lee et al. | |
| 2006/0133506 | A1 | 6/2006 | Dang | |
| 2006/0176299 | A1 | 8/2006 | Subbalakshmi et al. | |
| 2006/0176962 | A1 | 8/2006 | Arimura et al. | |
| 2006/0203916 | A1 | 9/2006 | Chandramouly et al. | |
| 2006/0291563 | A1 | 12/2006 | Park et al. | |
| 2007/0002945 | A1 | 1/2007 | Kim | |
| 2007/0002950 | A1 | 1/2007 | Yang | |
| 2007/0036215 | A1 | 2/2007 | Pan et al. | |
| 2007/0070080 | A1 | 3/2007 | Graham et al. | |

(56) References Cited

U.S. PATENT DOCUMENTS

| | | |
|---|---|---|
| 2007/0133689 A1 | 6/2007 | Park et al. |
| 2007/0171981 A1 | 7/2007 | Qi |
| 2007/0217506 A1 | 9/2007 | Yang et al. |
| 2007/0230564 A1 | 10/2007 | Chen et al. |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |
| 2008/0117214 A1 | 5/2008 | Perani et al. |
| 2008/0137726 A1 | 6/2008 | Chatterjee et al. |
| 2008/0151997 A1 | 6/2008 | Oguz |
| 2008/0285444 A1 | 11/2008 | Diab et al. |
| 2009/0060277 A1 | 3/2009 | Zhang et al. |
| 2009/0086827 A1 | 4/2009 | Wu et al. |
| 2009/0116549 A1 | 5/2009 | Shen et al. |
| 2009/0122864 A1 | 5/2009 | Palfner et al. |
| 2009/0161763 A1 | 6/2009 | Rossignol et al. |
| 2009/0196350 A1 | 8/2009 | Xiong |
| 2009/0268974 A1 | 10/2009 | Takagi |
| 2010/0034268 A1 | 2/2010 | Kusakabe et al. |

FOREIGN PATENT DOCUMENTS

| | | |
|---|---|---|
| GB | 2348559 A | 4/2000 |
| JP | 04162893 | 6/1992 |
| JP | 11096138 | 4/1999 |
| JP | 2001184323 | 7/2001 |
| JP | 2005-192232 | 7/2005 |
| JP | 2005354686 | 12/2005 |
| JP | 2006287315 | 10/2006 |
| WO | 9827742 | 6/1998 |
| WO | 0233650 | 4/2002 |
| WO | 2005001625 A2 | 1/2005 |
| WO | 2005096168 | 10/2005 |
| WO | 2006085137 | 8/2006 |

OTHER PUBLICATIONS

Tourapis et al., Proc. of SPIE Conf. Vis. Comm. and Img. Processing, vol. 3, pp. 1365-1373, June '00.

Zheng, et al., Inter. Conf. Info. Systems, Analysis and Synthesis, SCI 2001-ISAS 2001, vol. 13, 2001.

Kadono Shinya, et. Al. Revised edition H. 264/AVC Textbook, Impress R&D, Jan. 1, 2006, pp. 131-133.

"Ralf Schafer et al.,", "H.264/AVC", Dated: Jan. 2003, pp. 1-12.

_The Merriam-Webster Dictionary_. 2005 ed. Springfield, MA: Merriam-Webster Inc., 2005.

3D Graphics Processor for Mobile Set Based on Configurable Processor; Takemoto, Takashi et al.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

Advanced Video Coding for generic audiovisual services, Telecommunication Standardization Sector of ITU, Dated Mar. 2005, pp. 1-343.

Andrew Gibson, "H.264 Video Encoding Standard", year Aug. 2002, pp. 1-98, Queens University Kingston Ontario Canada.

Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III to 844.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.

Jamil-Ur-Rehman and Dr. Zhang Ye, "Efficient Techniques for Signaling Intra Prediction modes of H.264/Mpeg-4 Part 10", Proceedings of the First International Conference on Innovative Computing, Information and Control, ICICIC, Year 2006, pp. 1-4.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Realization of Low-Bit_Ratio Video Encoder Using Mpact Media Processor; Iwasaki, Junichi et al.; 1997.

Rohini Krishnan, et al., "Design of a 2D DCT/IDCT Application Specific VLIW Processor Supporting Scaled and Sub-sampled Blocks," 16th International Conference on VLSI Design, 2003, six pages.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.

Tu, C., Liang, J., and Tran, T. "Adaptive Runlength Coding", in_IEEE Signal Processing Letters_vol. 10, No. 3, pp. 61-66. Mar. 2003.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

\* cited by examiner

400A

| 0,0 | 1,0 | 2,0 | 3,0 | 4,0 | 5,0 |
|-----|-----|-----|-----|-----|-----|
| 0,1 | 1,1 | 2,1 | 3,1 | 4,1 | 5,1 |
| 0,2 | 1,2 | 2,2 | 3,2 | 4,2 | 5,2 |
| 0,3 | 1,3 | 2,3 | 3,3 | 4,3 | 5,3 |
| 0,4 | 1,4 | 2,4 | 3,4 | 4,4 | 5,4 |
| 0,5 | 1,5 | 2,5 | 3,5 | 4,5 | 5,5 |

| | RAM 0 | RAM 1 | RAM 2 | RAM 3 | RAM 4 | RAM 5 | RAM 6 | RAM 7 |
|---|---|---|---|---|---|---|---|---|
| addr0 | [0,0] | 7,0 F,0 | 6,0 E,0 | 1,0 9,0 | 2,0 A,0 | [5,0] D,0 | 4,0 C,0 | 3,0 B,0 |
| addr1 | 4,1 C,1 | 3,1 B,1 | [0,1] 8,1 | 7,1 F,1 | 6,1 E,1 | 1,1 9,1 | 2,1 A,1 | [5,1] D,1 |
| addr2 | 2,2 A,2 | [5,2] D,2 | 4,2 C,2 | 3,2 B,2 | [0,2] 8,2 | 7,2 F,2 | 6,2 E,2 | 1,2 9,2 |
| addr3 | 6,3 E,3 | 1,3 9,3 | 2,3 A,3 | [5,3] D,3 | 4,3 C,3 | 3,3 B,3 | [0,3] 8,3 | 7,3 F,3 |
| addr4 | (0,4) 8,4 | 7,4 F,4 | 6,4 E,4 | (1,4) 9,4 | (2,4) A,4 | 5,4 D,4 | 4,4 C,4 | (3,4) B,4 |
| addr5 | 4,5 C,5 | (3,5) B,5 | (0,5) 8,5 | 7,5 F,5 | 6,5 E,5 | (1,5) 9,5 | (2,5) A,5 | 5,5 D,5 |

SYSTEM FOR PERFORMING FINITE INPUT RESPONSE (FIR) FILTERING IN MOTION ESTIMATION

FIELD OF THE INVENTION

Embodiments of the present invention relate to video coding. More specifically, embodiments of the present invention relate to systems for performing finite input response (FIR) filtering for motion compensation.

BACKGROUND ART

Digital video compression is an important feature in many products. Many video coding standards (e.g., MPEG-1, MPEG-2, MPEG-4, H.263, H.264, etc.) provide performance requirements that video coding architectures implementing the digital video compression need to satisfy. For instance, the motion picture entertainment group (MPEG) standards are aimed at video images for digital television, and the H.264 standard published by the International Telecommunication Union (ITU) is aimed at video coding for low bit rates. However, the challenge is to satisfy the requirements of the various video coding standards in an architecture that provides high performance. Conventional video coding architectures have been unable to meet this challenge.

The data path to perform digital video compression for the various standards discussed above includes motion compensation. In essence, motion compensation exploits image redundancy between video frames to achieve high video-compression ratios. That is, a video sequence consists of a series of video frames. A previous video frame is selected as a reference frame. Current and subsequent frames can be predicted from the reference frame using motion compensation techniques, in part. That is, the movement of areas of previous frames are estimated and compensated for inclusion in a current frame.

In particular, motion compensation performs finite input response (FIR) filtering on a two-dimensional (2D) block of pixel data. FIR filtering is used to filter out additional noise of the input signal which can ultimately degrade the video output signal. The amount of FIR filtering required to perform video decompression in real time, requires multiple computation data paths.

Conventionally, a single instruction multiple data (SIMD) structure is used in the video coding architecture to execute multiple instances of the same operation, such as FIR filtering, in parallel using different data. That is, the SIMD structure can minimize the amount of control logic relative to the compute logic by using the same control for all instances of a replicated data path. The SIMD structure is therefore efficient due to the minimal overhead for each additional data path.

However, while the SIMD structure is efficient, the SIMD structure can be difficult to fully utilize because each data path must do the same computation in lock step. That is, conventional architectures are unable to present the appropriate data to the appropriate data path in order to perform motion compensation in an efficient manner. In particular, conventional video coding architectures have been unable to efficiently perform various performance requirements as specified by the video coding standards, such as, providing both vertical and horizontal filtering which implies that both rows and columns of data need to be presented to the replicated data paths, providing real-time edge replication on the border of reference frames, and providing the ability to swap X and Y coordinates for rotating the display.

For instance, the FIR filtering is required during motion compensation. A Multiply and Accumulate (MAC) is a data path element that can be used to compute an FIR filter 1 tap at a time. A common optimization is to fold the filter when the number of taps is even and the filter kernel is symmetric. This requires an additional adder, but allows 2 taps to be computed per clock. While this makes more efficient use of the MAC element, it can be difficult to access the appropriate data because it requires two unrelated reads.

As such, conventional architectures for performing motion compensation are unable to efficiently provide performance requirements as specified by the various video coding standards, such as providing both rows and columns of data, providing folding of the filter, providing edge replication of a reference frame, and providing the ability to perform X and Y swapping of coordinates.

SUMMARY OF THE INVENTION

Accordingly, the present invention provides, in various embodiments, a system for performing FIR filtering in motion compensation when performing video decoding. The system architecture includes a group of random access memories (RAMs), crossbars, and an address translation feature for mapping block data into the RAMs to allow the data path implementing the FIR filtering to he highly utilized and efficient.

Specifically, in one embodiment, a system is described for performing finite input response filtering. The system includes an array of random access memories (RAMs) for storing at least one two-dimensional (2D) source block of pixel data. The source block can be as large as 9×9 (using 8 bit values). In addition, the array of RAMs also stores intermediate results from the replicated data paths performing the finite input response filtering. The intermediate values are 16 bits, and as such the reference block can be as large as 9×4 or 4×9. The pixel data is stored such that one of each type of column or row from the 2D block of pixel data is stored per RAM. That is, the pixel data is stored such that each RAM in the array of RAMs stores one pixel from a row or column of the 2D source block of pixel data. A control block provides address translation between the 2D block of pixel data and corresponding addresses in the array of RAMs. An input crossbar writes pixel data to the array of RAMs as directed by the control block. An output crossbar simultaneously reads pixel data from each of the array of RAMs and passes the data to an appropriate replicated data path, as directed by the control block. A single instruction multiple data path block includes a plurality of replicated data paths for simultaneously performing the FIR filtering, as directed by the control block.

Another embodiment of the present invention describes a system for performing FIR filtering in motion estimation. The system includes a storage block for storing pixel data corresponding to at least one 2D block of pixel data. The pixel data is stored in a manner such that multiple rows or columns of the block of pixel data can be read simultaneously. The system also includes a SIMD block. The SIMD block includes a plurality of replicated data paths for simultaneously performing the FIR filtering on each of the replicated data paths. In addition, the system also includes a control block for controlling data flow through the storage block and the SIMD block.

BRIEF DESCRIPTION OF THE DRAWINGS

The accompanying drawings, which are incorporated in and form a part of this specification, illustrate embodiments of the present invention and, together with the description, serve to explain the principles of the invention:

FIG. 4A is a diagram of pixel data in screen space on a display, in accordance with one embodiment of the present invention.

FIG. 4B is a diagram of the pixel data of FIG. 4A that is translated and stored in an array of RAMs in which two rows and two columns (1 even and 1 odd) of a source block are accessed, in accordance with one embodiment of the present invention.

DETAILED DESCRIPTION OF THE INVENTION

Figure 1:
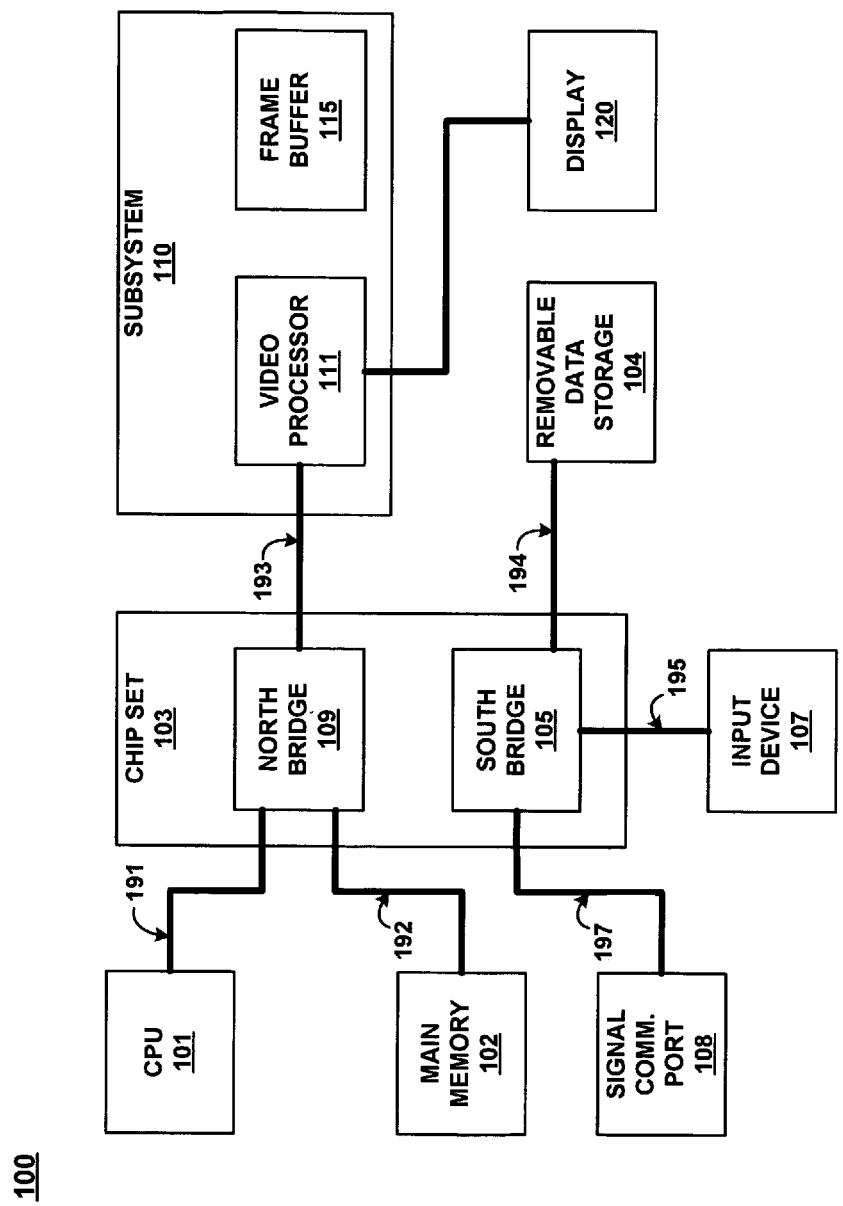
FIG. 1 is a block diagram of a computer system in which embodiments of the present invention can be implemented, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Accordingly, embodiments of the present invention provide a system that efficiently performs FIR filtering when performing motion compensation. Embodiments of the present invention are capable of efficiently presenting appropriate data to the appropriate data path when performing multiple FIR filtering operations simultaneously in a SIMD block. Other embodiments of the present invention are capable of providing both rows and columns of block of data to the replicated data paths in a SIMD block when performing FIR filtering for optimal utilization. Still other embodiments of the present invention are capable of providing replication of edge data of a reference frame when the FIR filter is performed on data outside of the reference frame on the fly. In addition, other embodiments of the present invention are capable of swapping X and Y coordinates in a block of data for rotating a display.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," or "calculating," or "scaling," or "performing," or "generating," or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

Embodiments of the present invention are implemented within stand-alone video processing units (VPUs). That is, the VPU is capable of performing FIR filtering in parallel in a SIMD block on different pixel data. Video processing is an important feature of modern high performance computing systems.

Other embodiments of the present invention are implemented within a computer system environment that comprises a VPU. With reference now to FIG. 1, a block diagram of an exemplary computer system 100 is shown upon which embodiments of the present invention can be implemented, in accordance with one embodiment of the present invention. Computer system 100 includes central processor unit 101, main memory 102 (e.g., random access memory), chip set 103 with north bridge 109 and south bridge 105, removable data storage device 104, input device 107, signal communications port 108, and video subsystem 110 which is coupled to display 120.

Computer system 100 includes several buses for communicatively coupling the components of computer system 100. Communication bus 191 (e.g., a front side bus) couples north bridge 109 of chipset 103 to central processor unit 101. Communication bus 193 (e.g., the Advanced Graphics Port interface) couples north bridge of chipset 103 to the video subsystem 110. Communication buses 194-197 (e.g., PCI bus) couple south bridge 105 of chip set 103 to removable data storage device 104, input device 107, signal communications port 108, respectively. In addition, the main memory 102 is coupled to the north bridge 109 via a point-to-point connection 192 between the memory controller on the north bridge 109 and the dynamic random access memory (DRAM).

The components of computer system 100 cooperatively operate to provide versatile functionality and performance. The operating characteristics of functional components included in computer system 100 can change dynamically. In one exemplary implementation, the components of computer system 100 cooperatively operate to provide predetermined types of functionality, even though some of the functional components included in computer system 100 may be defective. Communications bus 191, 193, 194, 195 and 197 communicate information. Central processor 101 processes information. Main memory 102 stores information and instructions for the central processor 101. Removable data storage device 104 also stores information and instructions (e.g., functioning as a large information reservoir). Input device 107 provides a mechanism for inputting information and/or for pointing to or highlighting information on display 120. Signal communication port 108 provides a communication interface to exterior devices (e.g., an interface with a network). Display device 120 displays information in accordance with data stored in frame buffer 115. Video processor 111 processes video commands from central processor 101 and provides the resulting data to frame buffers 115 for storage and retrieval by display monitor 120. For example, in one embodiment, the video processor 111 is capable of performing FIR filtering in parallel on different sets of data for motion compensation.

The operational configurations of the functional components included in computer system 100 are flexibly adaptable to meet a variety of objectives. For example, operational configurations of the functional components included in computer system 100 are configurable to maintain execution of a type of function even if some of the functional components are disabled. In one exemplary implementation, central processor 101 and video processor 111 are still capable of executing the same type of processing functions and main memory 102 stores information even though some of the functional components (e.g., floating point component, pixel shader component, memory cell component, etc) are disabled. In one embodiment, the processors include a plurality of functional components for performing processing operations. The operational characteristics of the functional components can be altered. In one embodiment, the processors include a plurality of functional components for performing processing operations, wherein defective functional components included in the plurality of functional components are disabled. The processors also include a workflow control component for dispensing workflow to enabled processing components and preventing distribution of workflow to the disabled defective components. In one exemplary implementation, computer system 100 can continue to provide full functionality even though the functionality may be provided at a reduced performance level (e.g., slower).

Figure 2:
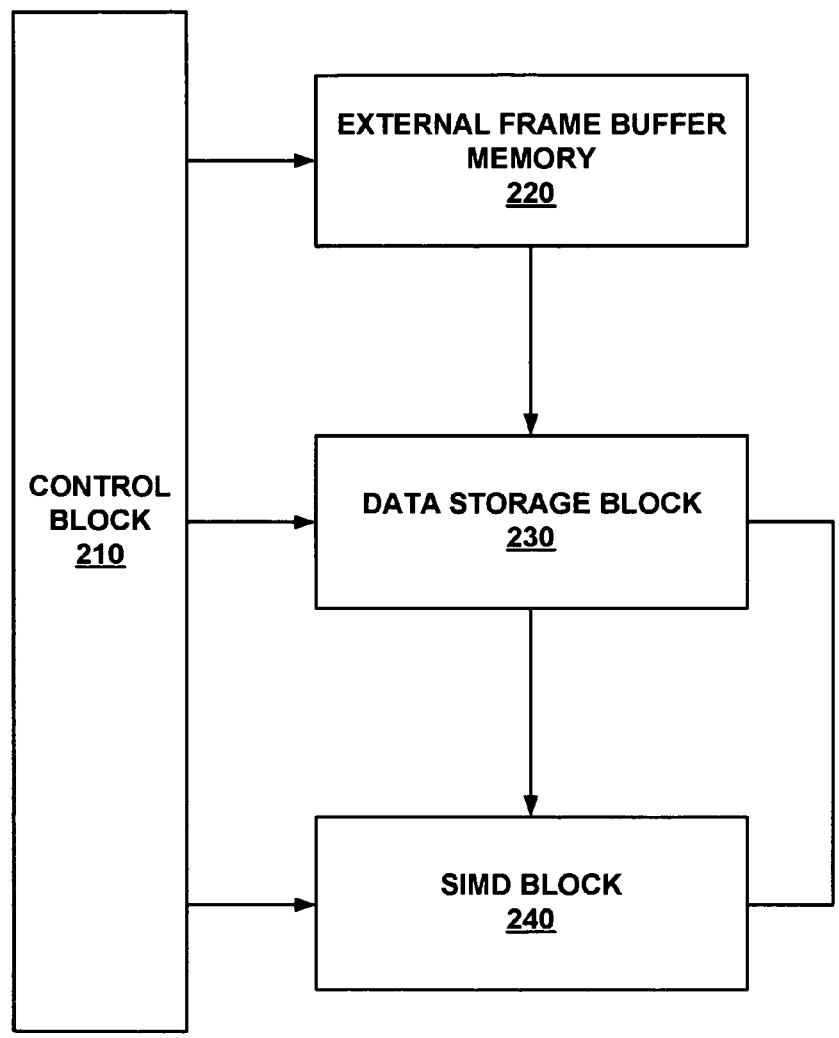
FIG. 2 is a block diagram of a system that is capable of performing FIR filtering in parallel for different pixel data for motion compensation, in accordance with one embodiment of the present invention.

Method and System for Performing Fir Filtering for Motion Compensation:

FIG. 2 is a block diagram of a system 200 that is capable of performing FIR filtering in parallel for different pixel data when performing motion compensation in compliance with various video coding standards (e.g., motion pictures entertainment group [MPEG] 1, 2, and 4; h.264, etc.), in accordance with one embodiment of the present invention. The embodiment of the present invention describes an architecture that includes a group of RAMs, crossbars, and an address translation for mapping block data into the RAMs for efficient utilization of the pixel data.

As shown in FIG. 2, the system 200 includes a storage block 230 for storing pixel data. The pixel data that is stored corresponds to at least one two-dimensional (2D) block of pixel data used for motion compensation. In particular, the present embodiment is able to store the 2D block of pixel data in such a manner that allows the system 200 to meet the requirements of the video coding standards, previously mentioned. Specifically, the pixel data is stored such that multiple rows or columns of a 2D block of pixel data can be read simultaneously in order to perform FIR filtering in parallel for motion compensation. As such, the present embodiment through the system 200 is able to perform both vertical on rows of the 2D block, and horizontal filtering on columns of the 2D block, provide replication of pixels in boundary cases when FIR filtering is performed on data outside the reference frame, and provide the ability to swap X and Y coordinates when rotating the display.

The system 200 also includes a single instruction multiple data path (SIMD) block 240 for performing the FIR filtering in parallel. The SIMD block 240 includes a plurality of replicated data paths, each of which simultaneously performs FIR filtering on pixel data provided to each of the replicated data paths. In particular, the FIR filtering performs interpolation of pixel data for a point that lies between two or more pixels.

The replicated data path in the SIMD block 240 includes a Multiply-Accumulate (MAC) block for multiplying a coefficient by the corresponding and delayed pixel data sample and accumulating the result. For instance, the MAC block includes an adder stage, a multiply stage, and a accumulate stage. In addition, the replicated data path includes other elements as will be more fully described below in relation to FIG. 3.

As shown in FIG. 2, the system 200 also includes a control block 210. The control block 210 controls the flow of pixel data through the storage block 230 and the SIMD block 240. In particular, the control block 210 provides for address translation for storing the pixel data in the data storage block 230 in such a manner such that multiple rows or columns of a 2D block of pixel data can be read simultaneously in order to perform FIR filtering in parallel for motion compensation. That is, the pixel data from a block of data of a reference frame obtained from an external frame buffer memory 220, or from intermediate pixel data outputted from the SIMD block 240 obtained through communication path 250 is mapped to a corresponding address in an array of memories of the data storage block 230.

As a result, the architecture of the system 200 is capable of either reading rows or columns of pixel data from a 2D block of pixel data. Further, because of the above capability, the system 200 is capable of replicating edge pixels on the fly, of reading even and odd rows of a block of pixel data simultaneously, and of reading even and odd columns of a block of pixel data simultaneously.

Figure 3:
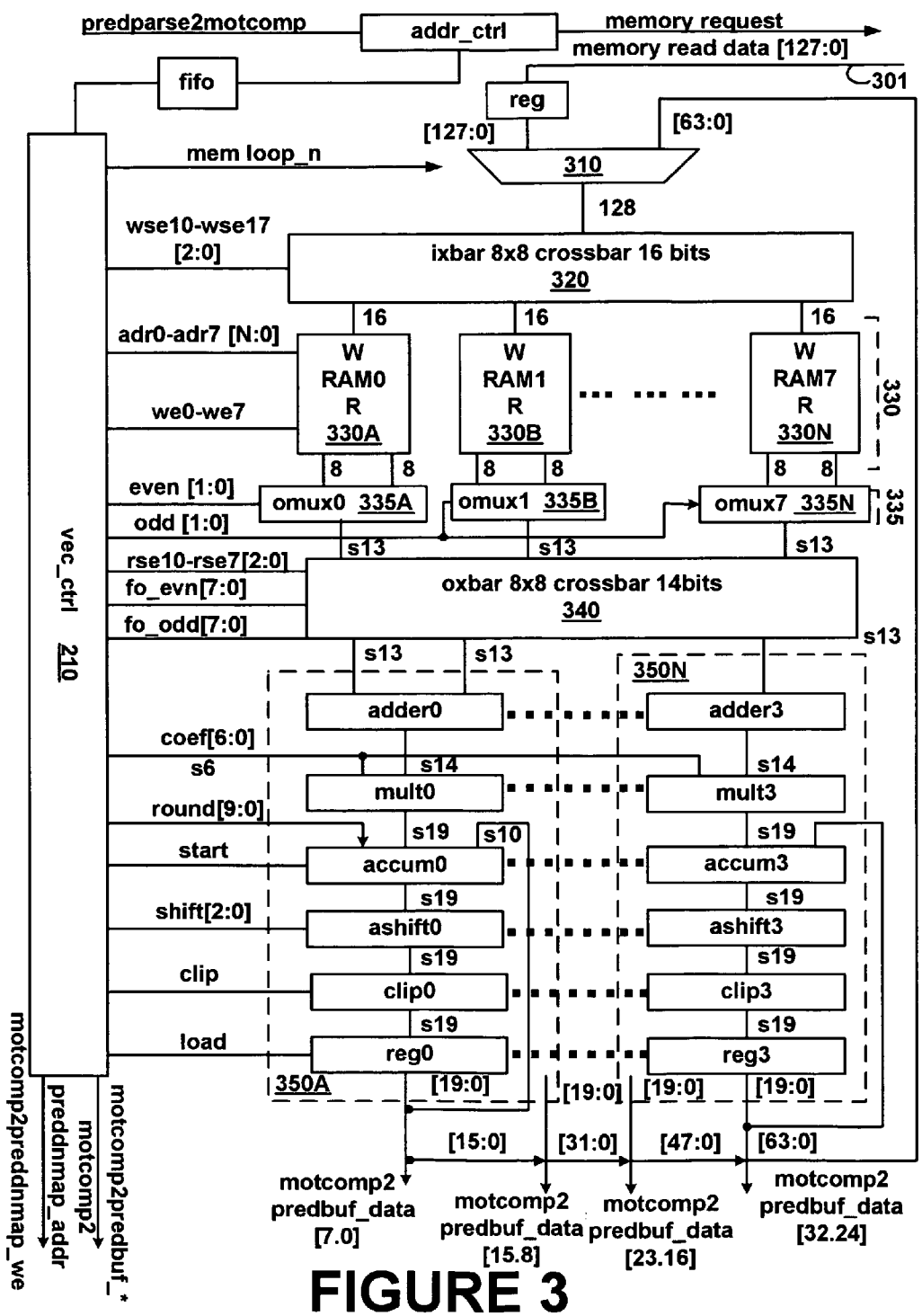
FIG. 3 is a block diagram of a system that is capable of performing address translation when storing a block of pixel data in an array of RAMs for use in performing FIR filtering in parallel for different pixel data for motion compensation, in accordance with one embodiment of the present invention.

FIG. 3 is a block diagram of a system 300 that is capable of performing address translation when storing a block of pixel data in an array of RAMs for use in performing FIR filtering in parallel for different pixel data for motion compensation, in accordance with one embodiment of the present invention. The present embodiment includes a group of RAMs, crossbars, and the ability to perform address translation for mapping the pixel data in a 2D block to the RAMs in such a manner that allows efficient implementation of FIR filtering when performing motion compensation.

The system 300 illustrates a SIMD design for parallel execution of FIR filtering when performing motion compensation. That is, the SIMD data path improves performance by allowing a processor to execute multiple instances of the same operation in parallel using different data. For instance, in the present embodiment, an SIMD multiply instruction could perform two or more multiplications of different sets of input data over two or more replicated data paths in a single clock cycle. This technique significantly increases the rate of computation for vector operations (e.g., FIR filtering) used in multimedia and signal processing applications.

The system 300 includes a vector control block 210. The vector control block 210 of FIG. 3 has analogous features as the features of the control block in FIG. 2. That is, the control block 210 is able to perform the address translation when mapping block pixel data into the array of RAMs 330 of the system 300. In particular, the control block 210 provides address translation between data received from a 2D block of pixel data obtained from a reference frame and corresponding addresses in an array of RAMs that stores the pixel data. In addition, the vector control block 210 is able to control data flow throughout the system 300, as will be described more fully below.

The vector control block 210 accesses and receives over path 301 pixel data from an external memory (e.g., an external frame buffer memory) that contains previous frames of video data. In addition, the vector control block 210 is able to access intermediate pixel data that is output from the replicated data paths of the SIMD block 350 for further processing in a feedback loop including path 304.

A multiplexor 310 receives the pixel data from the external memory and through the feedback loop and groups the data into an appropriate word length. For instance, in one embodiment, the word length is 128 bits comprising eight 16-bit data elements of pixel data.

The system 300 includes a data storage path that includes the input crossbar 320, the array of RAMs 330, the output crossbar 340, and the SIMD block 350. In particular, the data storage path gets input data from and writes its results to the array of RAMs 330. The array of RAMs 330 includes RAM 330A through RAM 330N. The data storage path also sends appropriate data to each of the replicated data paths in the SIMD block 350 for parallel execution of FIR filtering.

In particular, the input crossbar 320 writes pixel data to the array of RAMs as directed by the control block. Specifically, the input crossbar includes a plurality of multiplexors for distributing the input pixel data from the multiplexor 310 to the appropriate RAM memory in the array 330. In one embodiment, the input crossbar 320 includes eight 16-bit 8-to-1 multiplexors. Each multiplexor is independently controlled by the vector control block 210, and corresponds to an associated RAM in the array of RAMs 330. The output of each of the multiplexor in the input crossbar 320 feeds the write port of each of an associated RAM in the array of RAMs 330.

In the present embodiment, there are three types of writes to the each of the RAMs in the array 330. The first type is pixel data obtained from external memory and written as row data. The second type is intermediate pixel data obtained through a feedback loop from the SIMD block 350 and is written as row data. The third type is intermediate pixel data obtained through a feedback loop from the SIMD block 350 and written as column data.

In one embodiment, the pixel data from the external memory is 8 bits, and each 128-bit word contains sixteen pixels of a row. The pixel data is aligned vertically on a sixteen pixel boundary.

In another embodiment, the feedback data is an assigned 13 bit value (s-13). As such, the feedback data is stored in the array of RAMs 330 as 16-bits and each 128-bit word contains 8 filtered pixels. This data is either arranged as a row, in one embodiment, or as a column, in another embodiment. The row data is aligned on a four-pixel boundary, in one embodiment. The column data can be aligned to any number of pixels, in one embodiment.

The system 300 includes an array of RAMs 330 that is a local buffer. The local buffer as shown in FIG. 3 includes N RAMs. In one particular implementation, the system 300 includes eight RAMs. Each RAM comprises a plurality of addresses, wherein each of the plurality of addresses stores data associated with a corresponding and predefined pixel in screen coordinates from a corresponding 2D block of pixel data. The array of RAMs is used to store the reference data from blocks obtained from the frame buffer, and intermediate results from the replicated data paths out of the SIMD block 350. In addition, the array of RAMs 330 buffers the prefetch data for the frame buffer for subsequent partitions.

In particular, the array of RAMs 330 stores at least one 2D block of pixel data obtained from the external memory. The 2D block of pixel data is stored such that one of each type of column or row data from the 2D block is stored per RAM in the array 330. That is, each RAM in the array of RAMs 330 stores one pixel from a row or column in the source block. As such, this mapping enables the system 300 to perform simultaneous FIR filtering on multiple rows or multiple columns of pixel data in the 2D block. In addition, the mapping enables the system 300 to access row data or horizontal data for FIR filtering in the SIMD block 350. Also, folding operations are possible when performing FIR filtering on a asymmetric block of pixel data. In addition, the mapping provides for the capability for the system 300 to swap X and Y coordinates for rotating a display.

Each of the RAMs in the array 330 is capable of storing two types of 2D arrays, in embodiments of the present invention. In one embodiment, the RAM stores 8-bit data in a 16×N or 32×N array. In another embodiment, each RAM is able to store 16-bit data in an 8×N or 16×N array.

More specifically, the array of RAMs 330 stores at least one source block of pixel data. The source block is as large as 9×9 (8 bit values), in one embodiment. In another embodiment, a 32×9 source block is read from memory due to access granularity. Also, each of the RAMs need to have space for storing intermediate results that are fed back from the replicated data paths from the SIMD block 350. In one embodiment, the intermediate values are 16 bits and can be as large as 9×4 or 4×9.

In one embodiment, the organization of each of the RAMs is such that two horizontal vectors of four values in a block of pixel data can be read simultaneously. Also, in another embodiment, the organization of each of the RAMs is such that two vertical vectors of four values in a block of pixel data is read simultaneously. This enables the replicated data paths to perform folding for either the horizontal filtering process or the vertical filtering process when performing FIR filtering.

In one embodiment, the data in the array of RAMs 330 is written as an aligned row of sixteen 8-bit values. In another embodiment, the data written in the array of RAMs 330 is written as an aligned row of four 16-bit values (e.g., half the RAMs). In still another embodiment, the data is written as an unaligned column of four 16-bit values (e.g., half the RAMs).

The local buffer stores reference frame data, temporary data, and prefetch data. The partition size is limited to 8×4 and 4×4 for illustration purposes only, as implemented through FIGS. 4A and 4B.

In one embodiment, only 4×4 and 8×4 partitions are supported. As such, the maximum reference size is 9×9 for H.264 6-tap filtering, as an example. Therefore the reference frame data can have a stride of 2 and a height of 9 for 18 words.

The temporary storage is used to store first pass filter data to be used in a subsequent pass. This data is 16-bits wide, in one embodiment. As such, only 8 samples can be stored per 128 bit word. The result of the first pass vertical filter is a 9×4. The result of the first pass horizontal filter is a 4×9 block. It is possible to store both as a 4×9 for 9 words, in one embodiment. In another embodiment, the blocks are stored as a 9×4 block for 16 words.

The H.264 filter when performing X and Y swapping requires that both horizontal and vertical pixel first pass samples need to be stored. The horizontal results require one word by 4 of storage, in one embodiment. The vertical results also 1 word by 4 of storage, in another embodiment.

In one embodiment, the prefetch requires just one partition. This is implemented in 18 words.

As a result, because of the foregoing, the total storage requirement for 4×4 partitions is 18+16+18=52 words, or 128 bits, in one embodiment. The previous example was provided for illustration purposes only. Other embodiments are well suited to a total storage requirement for 4×4 partitions that is less than 52 words using further optimizations.

In addition, the system 300 includes a plurality of output multiplexors 335. For instance, the plurality of output multiplexors 335 includes multiplexors 335A, 335B, on put to 335N. For purposes of illustration, there are eight multiplexors (omux0-omux7) shown in FIG. 3, in one embodiment. That is, each multiplexor is associated with a corresponding RAM. For instance, multiplexor 335A is associated with RAM 330A. Each of the plurality of multiplexors 335 selects an appropriate storage format in which the pixel data is stored in an associated RAM for use in the FIR filtering.

The output multiplexors receives two 8-bit values from the read port of the local RAMs. The two 8-bit values are designated H and L. For instance, the output is {6'b0,L}, {6'b0,H}, which are used for 8-bit data from external memory. The output can also be expressed as {H[5:0],L}, which is feedback from the data path.

The system 300 also includes an output crossbar 340. The output crossbar simultaneously reads pixel data from each of the array of RAMs, and passes the data read from each of the array of RAMs to an appropriate replicated data path, as directed by the control block 210. In particular, the output crossbar 340 is able to simultaneously read both row and column data, even and odd rows in a 2D block of pixel data, and simultaneously reading an even and odd column in a 2D block of pixel data simultaneously.

In one embodiment, the output crossbar includes eight 14-bit 8 to 1 multiplexors. The multiplexors read selected pixel data stored in the array of RAMs 330. Each multiplexor is independently controlled by the control bar 210. There are two different types of reads, in the present embodiment. The first read includes reads of one even and one odd row, with the same column alignment. The second read includes reads of one even and one odd column with the same row alignment. In the embodiment with 8 RAMS, the row reads are implemented as a mod 4 aligned in x. This function is controlled by f0_even and f0_odd signals from the vector control block 210.

Also shown in FIG. 3 is a SIMD block 350 that includes replicated data paths 350A on up to 350N. The SIMD block 350 includes a plurality of replicated data paths for simultaneously performing the FIR filtering on each of the replicated data paths, as directed by the control block 210. As shown in FIG. 3, four replicated data paths are included in the SIMD block 350.

The SIMD block 350 executes multiple instances of the same operation in parallel using different data. For example, each replicated data path executes a filter operation that performs operations on a vector of input data and a vector of filter coefficients. For each tap of the filter, a data sample is multiplied by a filter coefficient, with the result added to an accumulated sum for all of the taps. The main components of the FIR filter are the multiply, add, and accumulate (MAC) stages. The adder is used to add even and odd row and column data when the FIR filter is symmetric and folded. Additional stages include a shift stage, a clip stage and a register stage.

FIGS. 4A and 4B provide illustrations of pixel data before and after address translation, as implemented by embodiments of the present invention. FIG. 4A is a diagram illustrating pixel data for pixels in screen space 400A, in accordance with one embodiment of the present invention. Each block in FIG. 4A represents a pixel on a screen 400A.

The screen 400A arranges pixels by rows and columns. Rows are arranged horizontally across the screen 400A, and columns are arranged vertically across the screen 400A. For example, the pixel characterized by column 0 and row 0 is denoted (0,0) in the corresponding block. The pixel (0,0) is associated with pixel data that is stored in a corresponding address of a corresponding RAM of the array of RAMs 330. As another illustration, the pixel characterized by column 3, row 2 is denoted (3,2).

FIG. 4B is a diagram of a table 400B illustrating the mapping of the pixel data corresponding to pixels in the screen 400A of FIG. 4A, in accordance with one embodiment of the present invention. That is, the table 400B shows how data is stored in the RAMs of the array 330. Each column represents a RAM and each row is an address in the RAM. Each address in each of the RAMs stores the associated data of a corresponding pixel in the screen 400A. In particular, FIG. 4B shows the access of two rows and two columns (one even and one odd) of a source block.

The example shown in FIG. 400B illustrates a 16×6 array of 8 bit data. The data in each cell is the "x,y" location in hex notation in screen coordinates. As shown in FIG. 400B, each address is portioned into two parts. That is, the first part contains an 8-bit pixel data from one pixel, as indicated, and the second part contains another 8-bit pixel data from another pixel, as indicated. For instance, for address 0 of RAM 0, the first half contains pixel data from column 0, row 0 (0,0) of the screen 400A. The second half contains pixel data from column 8, row 0 (8,0) from screen 400A.

FIGS. 4A and 4B illustrate how data is accessed in the array of RAMs 330, in accordance with one embodiment of the present invention. As shown in FIG. 400B, an even/odd column pair and an even/odd row pair are highlighted. The column pairs are highlighted with addresses located in a block. For instance, the columns are (0,0) through (0,3) and (5,0) through (5,3). The row pairs are highlighted with addresses located in a circle. For instance, the rows are (0,4) through (3,4) and (0,5) through (3,5). In one embodiment, multiple columns can be read simultaneously since only one column pair exists per RAM. For instance, two columns (e.g., 0 and 3) can be read simultaneously. In another embodiment, multiple rows can be read simultaneously, since only row pair exists per RAM in the array 330. For instance two rows (e.g., 0 and 3) can be read simultaneously.

In one embodiment, the mapping equation is provided in equations (1) and (2) using Verilog syntax, as follows:

$$Col[3:0]=(\{x[1],x[0],x[0],x[3]\}\verb|^|\{x[2],x[2],2'b0\})+ \{y[1:0],2'b0\} \quad (1)$$

and $$Addr[N:0]=y[N:0] \quad (2)$$

In one embodiment, the equations 1 and 2 assume that the local buffer of the array 330 has a stride of one. In other embodiments, strides of two and three are also supported. The stride of a frame buffer indicates the number of bytes in memory that it takes to represent one line of pixels on a display, which should be a multiple of 4 bytes.

FIGS. 5A, 5B, 5C, and 5D provide examples in which embodiments of the present invention are capable of supporting the various video coding standards. In each implementation, the output crossbar 340 allows for rows and columns to be read from a block of pixels.

Figure 5A:
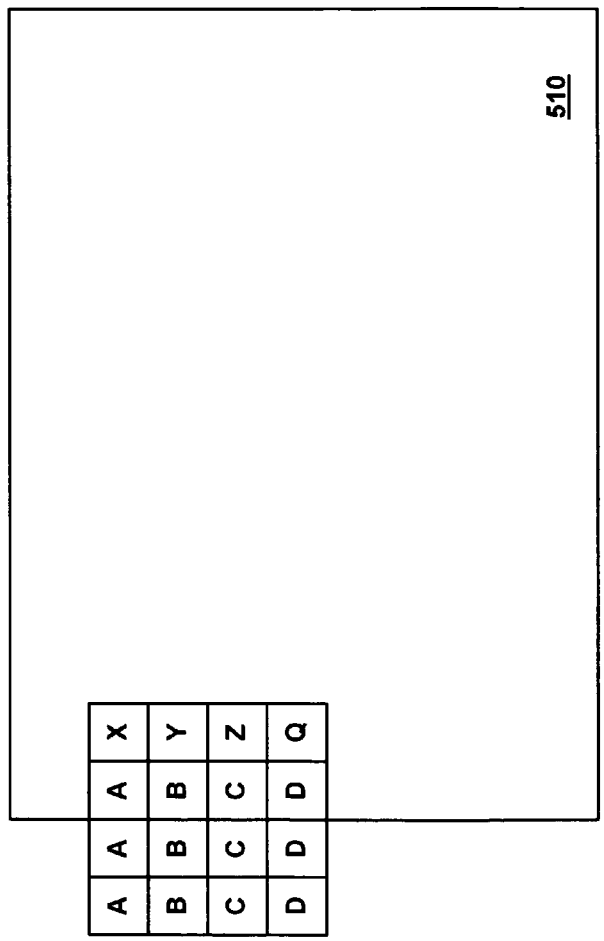
FIG. 5A is a diagram of a generated block of pixel data on an edge of a reference frame of pixel data that is generated on the fly when performing FIR filtering for motion compensation, in accordance with one embodiment of the present invention.

For instance, FIG. 5A is a diagram 500A of a generated block of pixel data on an edge of a reference frame of pixel data that is generated on the fly when performing FIR filtering for motion compensation, in accordance with one embodiment of the present invention. As shown in FIG. 5A, the column indicated by pixels A, B, C, and D are replicated in cells outside the reference frame 510. In the present embodiment, the output multiplexor 340 is able to generate the replicated cells outside of the reference block 510 on-the-fly, and without storing those cells in the array of RAMs 330. That is, the output crossbar 340 is able to generate the edge pixels of the 2D block. This provides for replicating edge pixels so that filtering outside of the reference frame does not affect the data path since the replicated cells are generated on-the-fly before the SIMD block 350.

Figure 5B:
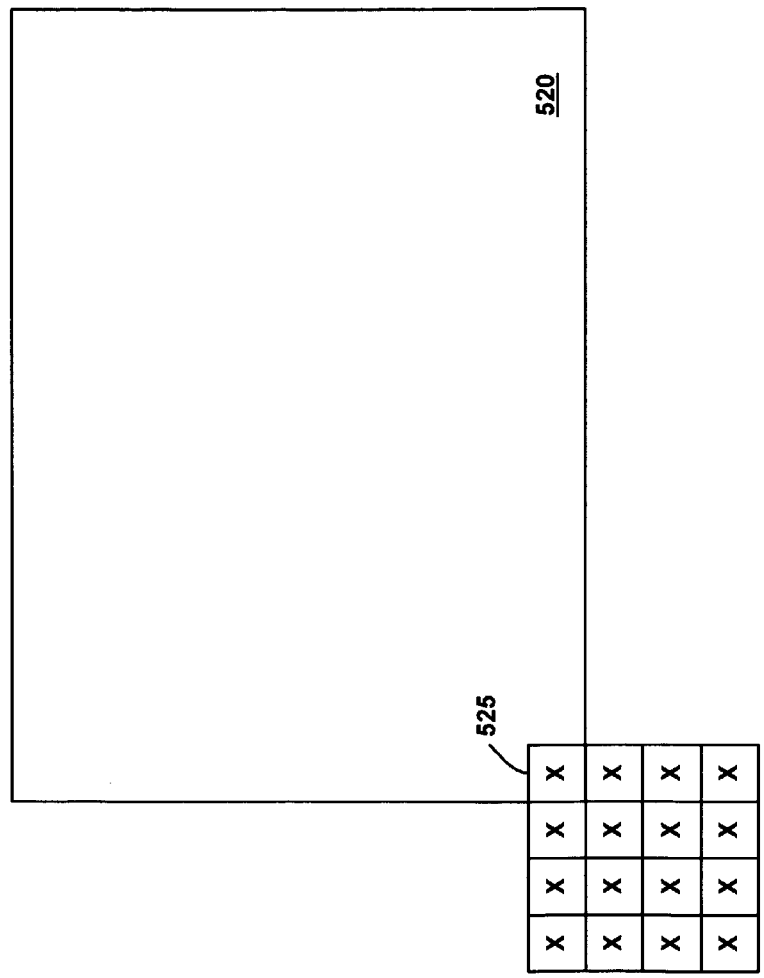
FIG. 5B is a diagram of a generated block of pixel data including one pixel of a corner of a reference frame of pixel data that is generated on the fly when performing FIR filtering for motion compensation, in accordance with one embodiment of the present invention.

FIG. 5B is a diagram 500B of a generated block of pixel data including one pixel (X) of a corner of a reference frame of pixel data that is generated on-the-fly when performing FIR filtering for motion compensation, in accordance with one embodiment of the present invention. As shown in FIG. 5B, the replicated cells outside the reference frame 520 replicate the corner cell 525, X. In the present embodiment, the output multiplexor 340 is able to generate the replicated cells outside of the reference block 520 on-the-fly without storing those cells in the array 330. As such, the replication of the corner cells outside of the reference frame 520 does not affect the replicated data paths since the replicated cells are generated on-the-fly before the SIMD block 350.

Figure 5C:
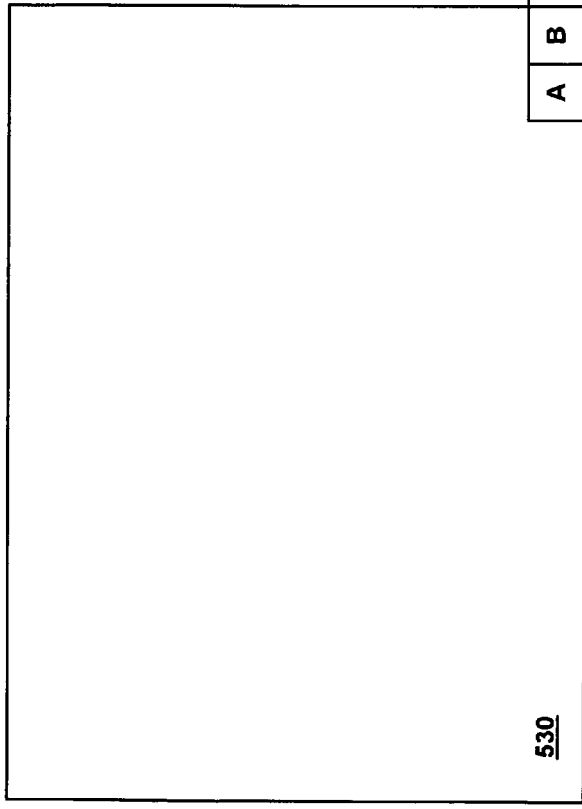
FIG. 5C is a diagram of a generated block of pixel data including four pixels of a corner of a reference frame of pixel data that is generated on the fly when performing FIR filtering for motion compensation, in accordance with one embodiment of the present invention.

FIG. 5C is a diagram 500C of a generated block of pixel data including four pixels (A, B, C, and X) of a corner of a reference frame of pixel data that is generated on the fly when performing FIR filtering for motion compensation, in accordance with one embodiment of the present invention. FIG. 5C uses the techniques shown in FIG. 5A for replicating an edge, and FIG. 5B for replicating a corner. As shown in FIG. 5C, the replicated cells outside the reference frame 530 replicate cells C and B on the edge, and cell X in the corner, as described previously. In the present embodiment, the output multiplexor 340 is able to generate the replicated cells outside of the reference block 530 on-the-fly, and without storing those cells in the array of RAMs 330. This provides for replicating edge and corner pixels so that filtering outside of the reference frame does not affect the data path since the replicated cells are generated on-the-fly before the SIMD block 350.

Figure 5D:
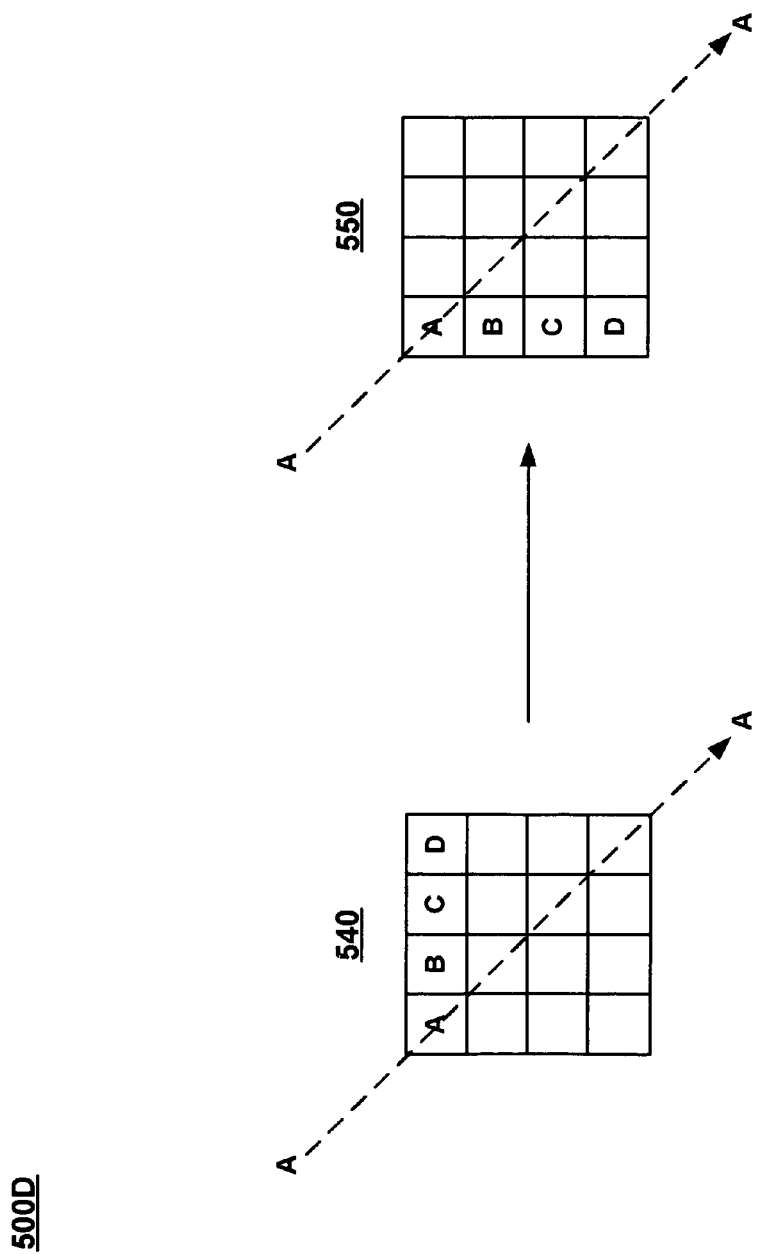
FIG. 5D is a diagram illustrating the swapping of X and Y coordinates as preformed by embodiments of the present invention.

FIG. 5D is a diagram 500D illustrating the swapping of X and Y coordinates as preformed by embodiments of the present invention. As shown in FIG. 5D, the row 540 of data is swapped into a column 550 of data along the line A-A. In the present embodiment, the output multiplexor 340 is able to generate the swapped cells on-the-fly, and without storing those cells in the array of RAMs 330. This provides for generating the swapped cells without affecting the data path since the generated cells are generated on-the-fly before the SIMD block 350.

Accordingly, the present invention provides, in various embodiments, a system for performing FIR filtering in motion compensation when performing video decoding. The system architecture includes a group of random access memories (RAMs), crossbars, and an address translation feature for mapping block data into the RAMs to allow the data path implementing the FIR filtering to be highly utilized and efficient. Embodiments of the present invention are capable of efficiently presenting the appropriate data to the appropriate data path when performing multiple FIR filtering operations simultaneously in a SIMD block. Other embodiments of the present invention are capable of providing both rows and columns of block of data to the replicated data paths in a SIMD block when performing FIR filtering for optimal utilization. Still other embodiments of the present invention are capable of providing replication of edge data of a reference frame when the FIR filter is performed on data outside of the reference frame on the fly. In addition, other embodiments of the present invention are capable of swapping X and Y coordinates in a block of data for rotating a display.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A system for performing FIR filtering in motion estimation, comprising:
   an array of a plurality of random access memories (RAMs) for storing at least one two-dimensional (2D) block of pixel data for a plurality of pixels, wherein said at least one block of pixel data is stored in said array of RAMs such that pixels, of each given column from said at least one 2D block of pixel data, are stored in different ones of said plurality of RAMs, or pixels, of each given row from said at least one 2D block of pixel data, are stored in different ones of said plurality of RAMs;
   a control block for providing address translation between data arranged in said at least one 2D block of pixel data and corresponding addresses in said array of RAMs wherein pixels, of each given column from said at least one 2D block of pixel data, are stored in different ones of said plurality of RAMs, or pixels, of each given row from said at least one 2D block of pixel data, are stored in different ones of said plurality of RAMs;
   an input crossbar for writing pixel data to said array of RAMs as directed by said control block;
   an output crossbar for simultaneously reading pixel data from each one of said plurality of RAMs of said array and passing said data read from each of said plurality of RAMs to an appropriate replicated data path, as directed by said control block; and a single instruction multiple data path (SIMD) block comprising a plurality of replicated data paths for simultaneously performing said FIR filtering on each of said replicated data paths, as directed by said control block.

2. The system of claim 1, further comprising:
a multiplexer for receiving pixel data from an external frame buffer storing previous frames and intermediate pixel data from said plurality of replicated data paths, and for arranging said received pixel data in a 128 bit word as input pixel data that is input to said input crossbar.

3. The system of claim 2, wherein said input crossbar further comprises:
a plurality of multiplexers for receiving said input pixel data and writing said input pixel data to said array of RAMs, wherein each of said plurality of multiplexers parse out appropriate pixel data for a corresponding RAM from said input of pixel data.

4. The system of claim 2, further comprising:
a plurality of output multiplexers each of which is associated with one RAM of said array of RAMs, wherein each of said plurality of output multiplexers selects an appropriate storage format in which said pixel data is stored in an associated RAM for use in said FIR filtering.

5. The system of claim 2, wherein said output crossbar further comprises:
a plurality of multiplexers for reading selected, pixel data stored in said array of RAMs.

6. The system of claim 1, wherein said output crossbar is capable of replicating edge pixels in said at least one 2D block of pixel data.

7. The system of claim 1, wherein said output crossbar is capable of simultaneously reading an even and odd row in said at least one 2D block of pixel data.

8. The system of claim 1, wherein said output crossbar is capable of simultaneously reading an even and odd column simultaneously.

9. The system of claim 1, wherein each of said array of RAMs comprises a plurality of addresses, wherein each of said plurality of addresses stores data associated with a corresponding and predefined pixel in screen coordinates from said at least one 2D block of pixel data.

10. The system of claim 1, wherein each of said replicated data paths in said SIMD block comprises:
an adder stage;
a multiplier state; and
an accumulator stage.

11. A system for performing FIR filtering in motion estimation, comprising:
an array of a plurality of random access memories (RAMs) for storing at least one two-dimensional (2D) block of pixel data for a plurality of pixels, wherein said at least one block of pixilated data is stored in said array of RAMs in a manner that multiple rows or columns of said at least one block, of pixilated data used for motion estimation can be read simultaneously by storing pixels, of each given column or each given row of said at least one 2D block of pixel data, in different ones of said plurality of RAMs, such that a set of pixels of the given column or the given row are each stored at different addresses within each respective one of the plurality of RAMs;
an input crossbar for receiving said at least one 2D block of pixel data and writing said at least one block of pixilated data to said array of RAMs, wherein pixels, of each given column or each given row of said at least one 2D block of pixel data, are stored in different ones of said plurality of RAMs, such that a set of pixels of the given column or the given row are each stored at different addresses within each respective one of the plurality of RAMs;
an output crossbar for simultaneously reading pixel data from each one of said plurality of RAMs of said array and passing said data read from each of said plurality of RAMs to an appropriate replicated data path, wherein one pixel, of each given column or each given row of said at least one 2D block of pixel data, is stored in different ones of said plurality of RAMs, such that a set of pixels of the given column or the given row are each stored at different addresses within each respective one of the plurality of RAMs;
a single instruction multiple data path (SIMD) block comprising a plurality of replicated data paths for simultaneously performing said FIR filtering on each of said replicated data paths, wherein each of said replicated data paths comprises an adder stage, a multiplier stage, and an accumulator stage; and
a control block for controlling data flow through said array of RAMs, said input cross bar, said output crossbar and said plurality of replicated data paths.

12. The system of claim 11, wherein each of said array of RAMs comprises a plurality of addresses, wherein each of said plurality of addresses stores data associated with a corresponding pixel in screen coordinates from said at least one block of pixel data.

13. The system of claim 11, further comprising:
a plurality of output multiplexers, each corresponding, to an associated RAM memory for selecting one of a plurality of storage formats in which said pixel data is stored in said associated RAM memory.

14. The system of claim 11, wherein said control block accesses said pixel data from external memory storing previous frames of data and accesses intermediate pixel data from said plurality of replicated data paths for input to said input crossbar.

15. The system of claim 11, wherein said control block, performs address translation so that said at least one 2D block of pixilated data is appropriately stored in said local buffer such that one of each type of column or row from said at least one 2D block of pixels is stored per RAM in said local buffer.

16. A system for performing FIR filtering in motion estimation comprising:
a plurality of storage traits for storing pixel data corresponding to at least: one two-dimensional (2D) block of pixel data wherein each of a set of pixels of a given column: or a given row of said at least one 2D block of pixel data is stored separately in different ones of said plurality of storage units in a manner that multiple rows or columns of said at least one block of pixel data can be read simultaneously from each one of said plurality of storage units;
a single instruction multiple data path (SIMD) block comprising a plurality of replicated data paths for simultaneously performing said FIR filtering of said at least one 2I) block of pixel data stored in said plurality of storage unit on each of said replicated data paths; and
control block for controlling data flow through said storage block and said SIMD block;
wherein said plurality of storage units further comprises:
an array of random access memories (RAMs) for storing said pixel data wherein said at least one block of pixilated data is stored in said array of RAMs such that one of each type of column or row from said at least one 2D block of pixels is stored in a different one of the plurality of RAMs of the array;

wherein said control block provides address translation between data received from said at least one 2D block of pixel data and corresponding addresses in said array of RAMs;

an input crossbar for writing pixel data to said array of RAMs as directed by said control block; and an output crossbar for simultaneously reading pixel data from each one of said plurality of RAMs of said array and passing said data read from each of said plurality of RAMs m an appropriate replicated data path, as directed by said control block.

17. The system of claim 16, wherein said output crossbar is capable of replicating edge pixels, of reading, an even and odd row simultaneously, and of reading an even and odd column simultaneously.

18. The system of claim 16, wherein said output crossbar is capable of reading either rows or columns of said at least one 20 block of pixel data.

19. The system of claim 16, wherein each of said replicated data paths in said SIMD block comprises;
   an adder stage;
   a multiplier stage; and
   an accumulator stage.

* * * * *